(12) United States Patent  (10) Patent No.: US 6,708,087 B2
Matsumoto  (45) Date of Patent: Mar. 16, 2004

(54) DISPLAY SYSTEM FOR VEHICLE

(75) Inventor: Shinji Matsumoto, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 138 days.

(21) Appl. No.: 09/982,905

(22) Filed: Oct. 22, 2001

(65) Prior Publication Data

US 2002/0055808 A1 May 9, 2002

(30) Foreign Application Priority Data

Nov. 7, 2000 (JP) ........................................ 2000-338941

(51) Int. Cl.⁷ .............................................. G06F 19/00
(52) U.S. Cl. ............................ 701/1; 348/149; 340/988
(58) Field of Search ............................ 701/1, 200, 207; 348/148, 149; 345/633; 340/903, 988

(56) References Cited

U.S. PATENT DOCUMENTS

| | | | | |
|---|---|---|---|---|
| 6,191,704 B1 | * | 2/2001 | Takenaga et al. | 340/903 |
| 6,515,597 B1 | * | 2/2003 | Wada et al. | 340/988 |
| 2002/0186228 A1 | * | 12/2002 | Kobayashi et al. | 345/633 |

FOREIGN PATENT DOCUMENTS

| | | | |
|---|---|---|---|
| JP | 10-96776 | * | 4/1998 |
| JP | 10-97700 | * | 4/1998 |
| JP | 11-014379 | | 1/1999 |
| JP | 11-339192 | | 12/1999 |
| JP | 2000-57491 | * | 2/2000 |
| JP | 2000-275057 | * | 10/2000 |
| JP | 2001-141495 | * | 5/2001 |

* cited by examiner

*Primary Examiner*—Gary Chin
(74) *Attorney, Agent, or Firm*—Foley & Lardner

(57) ABSTRACT

A display system for a vehicle is comprised of a projector which projects a virtual preceding vehicle at a position ahead of a driver of a host vehicle, a vehicle condition detecting unit which detects a vehicle traveling condition of the host vehicle, a road condition detecting unit which detects a road condition of a road ahead of the host vehicle and a controller coupled to the projector, the vehicle condition detecting unit and the road condition detecting unit. The controller arranged to calculate a traveling condition of the virtual preceding vehicle on the basis of the vehicle traveling condition and the road condition, and to command the projector to project the preceding vehicle which travels under the calculated traveling condition of the virtual preceding vehicle.

21 Claims, 6 Drawing Sheets

FIG.7B             FIG.7A
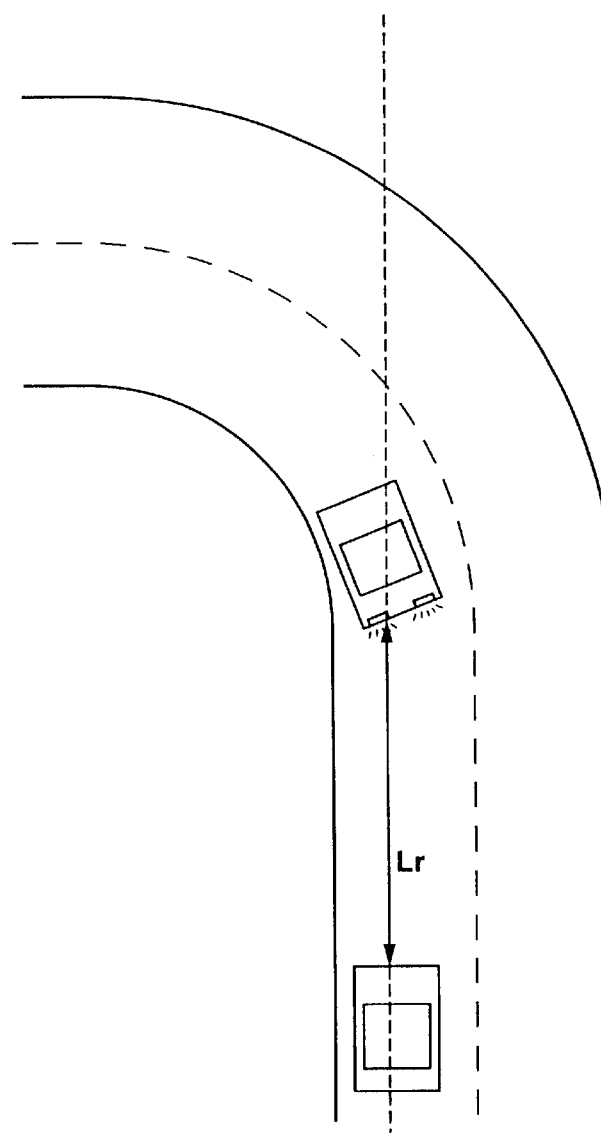
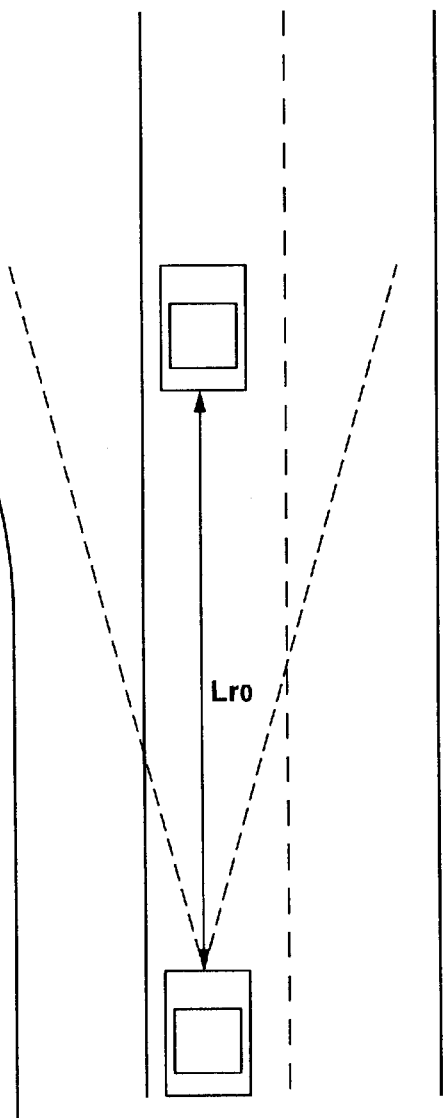

DISPLAY SYSTEM FOR VEHICLE

BACKGROUND OF THE INVENTION

The present invention relates to a display system for a vehicle, and more particularly to a display system which displays information of a road condition of a road ahead of a host vehicle.

Japanese Patent Provisional Publication No. 11-339192 discloses a display system which displays vehicles located near a host vehicle. The display system changes a displaying condition of a vehicle when it is determined that the vehicle affects the driving of the host vehicle.

SUMMARY OF THE INVENTION

However, such a display system yet has problems to be further improved.

It is therefore an object of the present invention to provide a display system that suitably assists a driver to drive a vehicle by smoothly and properly supplying information as to a road condition of a road ahead of the vehicle to the driver.

An aspect of the present invention resides in a display system for a vehicle. The display system comprises a projector, a vehicle condition detecting unit, a road condition detecting unit and a controller. The projector projects a virtual preceding vehicle at a position ahead of a driver of a host vehicle. The vehicle condition detecting unit detects a vehicle traveling condition of the host vehicle. The road condition detecting unit detects a road condition of a road ahead of the host vehicle. The controller is coupled to the projector, the vehicle condition detecting unit and the road condition detecting unit. The controller is arranged to calculate a traveling condition of the virtual preceding vehicle on the basis of the vehicle traveling condition and the road condition, and to command the projector to project the preceding vehicle which travels under the calculated traveling condition of the virtual preceding vehicle.

Another aspect of the present invention resides in a display system which comprises a preceding vehicle displaying section which displays a virtual preceding vehicle at a position ahead of a host vehicle driven by a driver; and a virtual preceding vehicle controlling section which changes a traveling condition of the virtual preceding vehicle so that the virtual preceding vehicle displayed is an image of the host vehicle at a predetermined future time.

Another aspect of the present invention resides in a method for displaying a virtual preceding vehicle. The method comprises a step for detecting a vehicle traveling condition of a host vehicle, a step for detecting a road condition of a road ahead of the host vehicle, a step for calculating a traveling condition of a virtual preceding vehicle on the basis of the vehicle traveling condition and the road condition, and a step for projecting the preceding vehicle which travels under the calculated traveling condition of the virtual preceding vehicle, at a position ahead of a driver of the host vehicle.

BRIEF DESCRIPTION OF THE DRAWINGS

FIG. 7A is a view showing an inter-vehicle distance between the host vehicle and a virtual preceding vehicle when the virtual preceding vehicle is traveling on a straight road.

FIG. 7B is a view showing the inter-vehicle distance when the virtual preceding vehicle just enters a curve.

Figure 1:
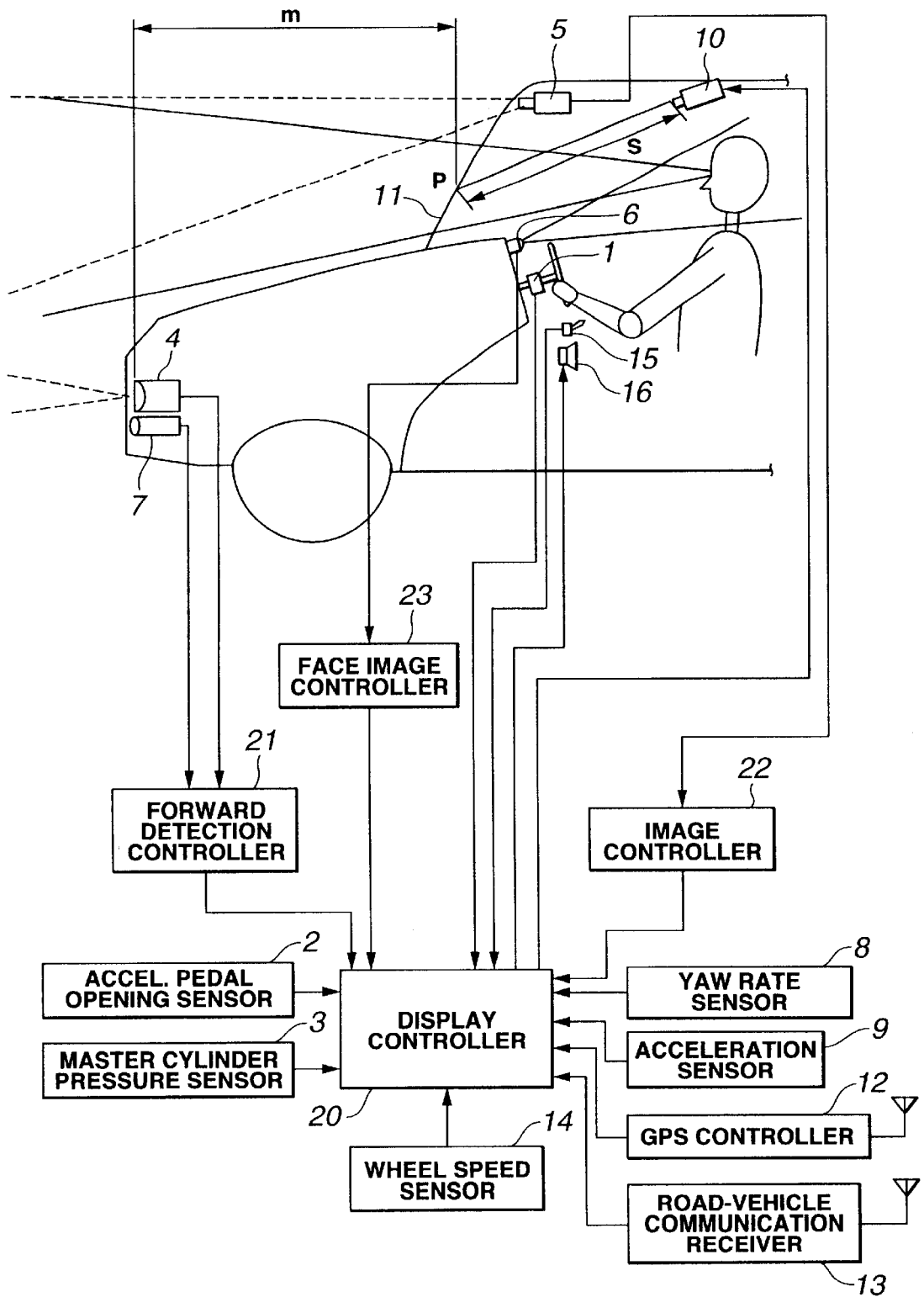
FIG. 1 is a schematic view showing a display system according to a first embodiment of the present invention.

DETAILED DESCRIPTION OF THE INVENTION (First Embodiment)

Referring to FIGS. 1 to 7B, there is shown a display system of a first embodiment according to the present invention.

The display system displays road and vehicle information of a road ahead of a host vehicle equipped with the display system. The road and vehicle information is displayed by projecting a virtual preceding vehicle as if the virtual preceding vehicle exists on a road lane ahead of the preceding vehicle. The display system comprises a display controller 20, a forward detection controller 21, an image controller 22, a face image controller 23, a GPS (global positioning system) controller 12 and various sensors.

As shown in FIG. 1, display controller 20 is coupled to a steering angle sensor 1 for detecting a steering angle δ representative of a steering quantity steered by a driver, an accelerator pedal opening sensor 2 for detecting an accelerator pedal opening Acc representative of an accelerator pedal controlled variable, and a master cylinder pressure sensor 3 for detecting a master cylinder pressure Pm representative of a brake controlled variable. These sensors 1, 2 and 3 functions as a drive operation detecting means of a traveling condition detecting means.

Further, the display system comprises a laser radar 4 for detecting an object ahead of the host vehicle and outputting a detection signal to forward detection controller 21, and a millimeter wave radar 7 for detecting an object in front of the vehicle and outputting a detection signal to forward detection controller 21.

Forward detection controller 21 is coupled to laser radar 4 and millimeter wave radar 7. Forward detection controller 21 processes the detection signals sent from laser radar 4 and millimeter wave radar 7, and calculates an inter-vehicle distance if a preceding vehicle exists ahead of the vehicle.

A simple-eye camera 5 is coupled to image controller 22 and monitors a forward of the host vehicle. An image detected by simple-eye camera 5 is inputted to image controller 22.

Image controller 22 detects lane markers on a road on the basis of the image and calculates a lateral position of the host vehicle and a curvature of the road ahead of the host vehicle.

Further, on the basis of the information from laser radar 4, millimeter wave radar 7 and simple-eye camera 5, display controller 20 detects and determines a road condition of the road ahead of the host vehicle by a self-contained manner.

GPS controller 12 receives signals from a plurality of satellites and accurately detects a position of the host vehicle. By the combination of the position detected by GPS controller 12 and map information stored as data base in display controller 20, display controller 20 calculates the position of the host vehicle on the map and a road shape of the road ahead of the host vehicle are calculated. This calculation functions as vehicle position detecting means of the forward road condition detecting means.

A road-vehicle communication receiver 13 coupled to display controller 20 receives road information from an infrastructure provided in the traveling road. Therefore, it is possible to detect the road information from the infrastructure if the traveling road is provided with the infrastructure. This arrangement functions as infrastructure information receiving means of forward road condition detecting means.

A yaw rate sensor 8 detects a yaw rate $d\phi$ of the host vehicle. Acceleration sensors 9 detect a longitudinal acceleration Xg in the longitudinal direction and a lateral acceleration Yg in the lateral direction of the host vehicle. Wheel speed sensors 14 are installed to wheels of the host vehicle and detect wheel speeds Vwi (i=1~4) of the respective wheels. Yaw rate senor 8, Acceleration sensors 9 and wheel speed sensors 14 are coupled to display controller 20.

On the basis of the signals from yaw rate sensor 8, acceleration sensors 9 and wheel speed sensors 14, display controller 20 detects the traveling condition of the host vehicle. This arrangement functions as vehicle behavior detecting means of the running condition detecting means.

A driver monitoring camera 6 for monitoring a condition of a driver is installed to an instrument panel in a passenger compartment of the host vehicle and is coupled to face image controller 23. Face image controller 23 receives information representative of a driver's face image from the monitoring camera 6 and detects the position of driver's eyes.

As mentioned above, display controller 20 is coupled to the respective sensors 1, 2, 3, 8, 9 and 15, GPS controller 12, road-vehicle communication receiver 13, forward detection controller 21, image controller 22 and face image controller 23 and receives the signals therefrom.

A projector 10 is coupled to display controller 20 and installed in a passenger compartment. Projector 10 projects a virtual preceding vehicle on an inner surface of a front window glass 11 according to a command of display controller 20. This projector 10 functions as a virtual preceding vehicle displaying means.

An alarm speaker 16 is coupled to display controller 20 and generates alarm sound to inform the driver that it is necessary to execute a quick braking operation.

A virtual preceding-vehicle display switch 15 is provided on the instrument panel and is turned on and off by the driver. According to the turning on and off of the switch 15, the display of the virtual preceding vehicle is displayed and not displayed. Virtual preceding-vehicle display switch 15 functions as a display changeover means.

Figure 2:
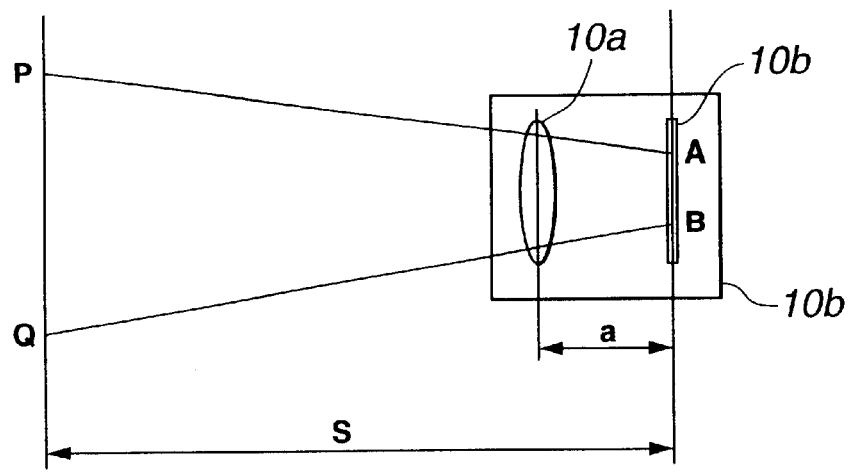
FIG. 2 is a side view showing a projector employed in the first embodiment.
Figure 4:
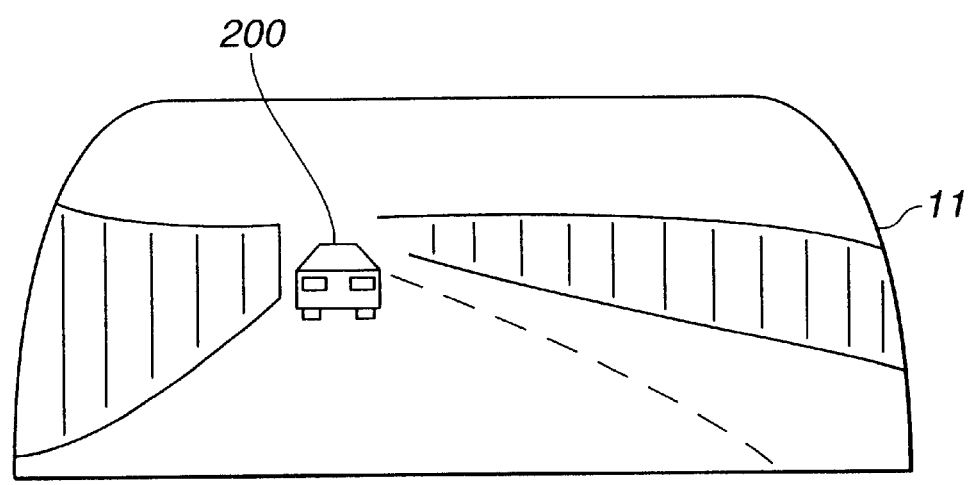
FIG. 4 is a view showing a vehicle model projected in a forward view as viewed from a host vehicle through a front window glass.

With reference to FIG. 2, projector 10 will be discussed. If it is assumed that a distance between front ends of an inter-vehicle distance detecting sections of laser radar 4 and millimeter wave radar 7 and a projecting section on front window glass 11 is set at m, it is preferable that a vehicle model is projected on front window glass as if the virtual preceding vehicle is ahead of the host vehicle by a distance L+m. When an image picture of projector 10 is AB and when an image projected on front window glass 11 is PQ, a magnification n of projector 10 is expresses by n=PQ/AB. If the image picture of the virtual preceding vehicle at the position ahead of the host vehicle by the distance L+m is XY, the magnification n may be adjusted such that PQ=XY. If the equation n=PQ/AB is replaced with a and s in FIG. 2, n=s/a is obtained. If a distance from projector 10 to front window glass 11 is fixed, a distance between a lens 10a and an image display device 10b is set such that the magnification n is obtained. With these arrangements a vehicle model 200 is projected as if being traveling in the forward view, as shown in FIG. 4.

Figure 3:
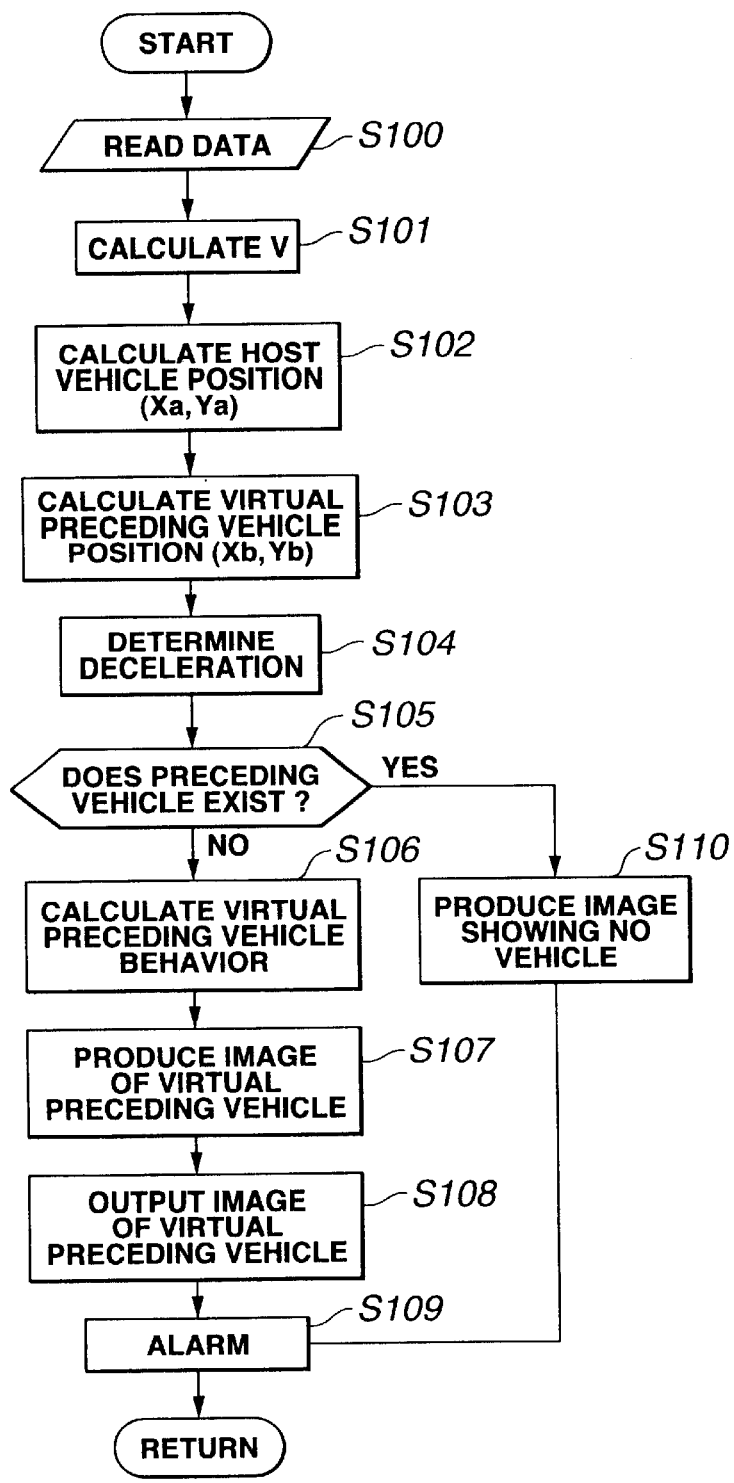
FIG. 3 is a flowchart of a display control process executed by a display controller of FIG. 1.

Next, the manner of operation of the display system according to the present invention will be discussed hereinafter. FIG. 3 shows a flowchart representative of a control program executed by display controller 20, and this flowchart corresponds to the above-mentioned virtual preceding vehicle control means. The processing of FIG. 3 is executed at predetermined time intervals as predetermined interruption processed by a not-shown operating system.

At step S100, display controller 20 reads steering angle $\delta$, accelerator pedal opening Acc, master cylinder pressure Pm, yaw rate $d\phi$, longitudinal acceleration Xg, lateral acceleration Yg, and each wheel speed Vwi (i=1~4). Further, image controller 22 reads a lateral displacement Yoff of the host vehicle and a road curvature $\beta$ of a road ahead of the host vehicle. Forward detection controller 21 reads an inter-vehicle distance L between the preceding vehicle and the host vehicle. Face image controller 23 reads a height Hm of eyes of the driver. Road-vehicle communication receiver 13 reads a distance X(m) from the host vehicle to a forward obstacle. GPS controller 12 reads a coordinate (Xao, Yao) of the host vehicle and a turn radius Rg of the forward road.

At step S101 display controller 20 calculates a vehicle speed V of the host vehicle. In this embodiment, when the vehicle executes a usual traveling, an average of front wheel speeds Vw1 and Vw2 is employed as vehicle speed V. That is, vehicle speed V of the host vehicle is calculated from the following equation (1).

$$V=(Vw1+Vw1)/2 \qquad (1)$$

In this embodiment, the host vehicle is a rear-wheel drive vehicle in which front wheels are driven wheels and rear wheels are driven wheels. Further, when an ABS control is being executed, an estimated vehicle speed estimated by an ABS controller is employed as vehicle speed V.

Figure 5:
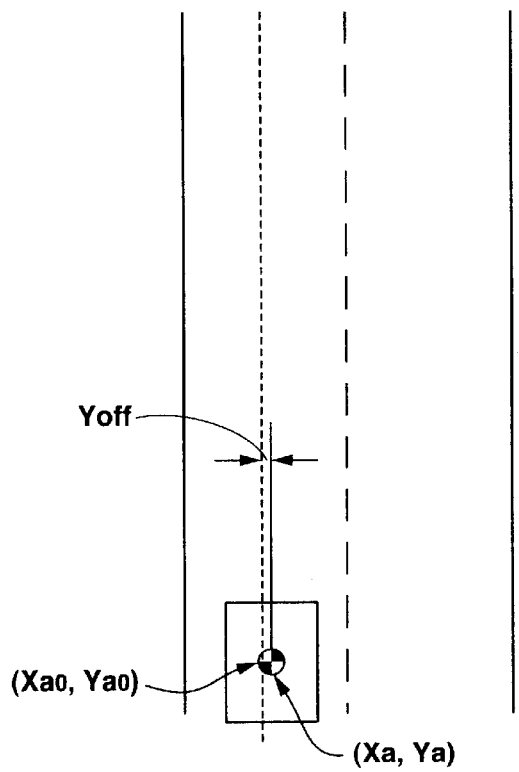
FIG. 5 is a view showing a calculation model for calculating a position of the host vehicle.

At step S102, display controller 20 calculates the position (Xa, Ya) of the host vehicle. In this embodiment, GPS controller 12 has already calculated a vehicle position on the basis of signal from artificial satellites, and the calculated vehicle position is matched with the map information to obtain the coordinate (Xao, Yao) of the host vehicle. Display controller 20 calculates the vehicle position (Xa, Ya) by correcting the map-matched host vehicle position in a manner of adding a correction of the lateral displacement Yoff of the host vehicle, which is obtained by image controller 22. For example, as shown in FIG. 5, when the coordinate (Xao, Yao) is located at a center of lane markers and when lateral displacement Yoff obtained by image controller 22 is not zero (Yoff≠0), the actual position of the host vehicle is simply offset by lateral displacement Yoff. Therefore, the actual host-vehicle position (Xa, Ya) is obtained by the correction of (Xa, Ya)=(Xao, Yao≠Yoff).

Figure 6:
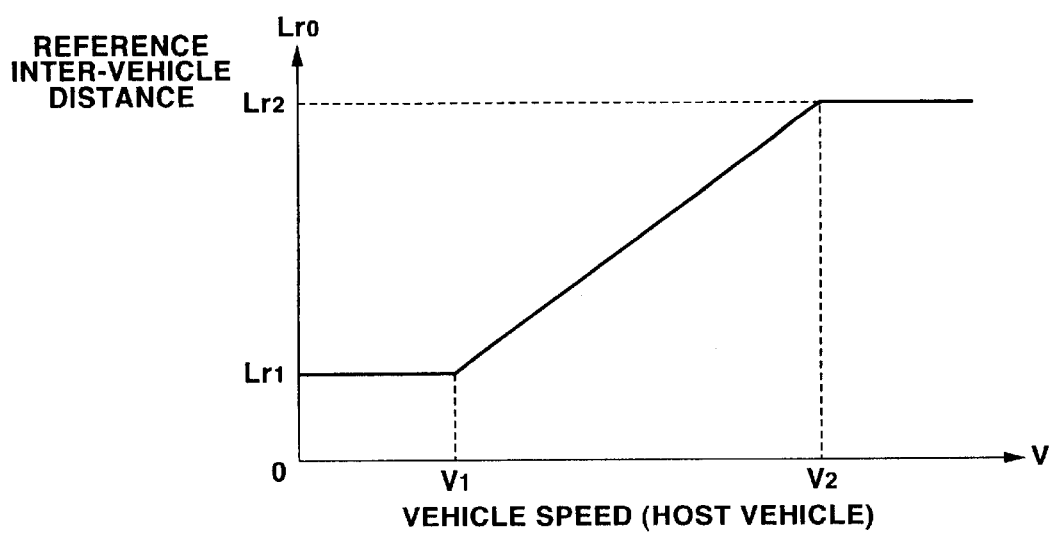
FIG. 6 is a graph showing a characteristic between a reference inter-vehicle distance and a vehicle speed.

At step S103, display controller 20 calculates a position (Xb, Yb) of the virtual preceding vehicle. In this embodiment, it is determined that basically a virtual preceding vehicle is located ahead of the host vehicle on a traveling lane and is remote from the host vehicle by a reference inter-vehicle distance Lro. Herein, reference inter-vehicle distance Lro is set to be increased according to the increase of vehicle speed V as shown in FIG. 6. Simplifying the explanation, it is assumed that the vehicle travels along the X-axis of the X-Y coordinate. By this assumption, the position of the virtual preceding vehicle is represented by the equation (Xb, Yb)=(Xa+Lro, Ya).

At step S104, display controller 20 executes a deceleration determination. More specifically, two determinations as the vehicle deceleration are executed. One of the two determinations is executed when the host vehicle travels while maintaining a present traveling condition to the virtual preceding-vehicle position (Xb, Yb). By this first determination, it is determined whether or not the host vehicle is decelerated to achieve a smooth traveling of the host vehicle under the above-condition. The second determination is executed when road-vehicle communication receiver 13 can receive road information of the road ahead of the host vehicle from an infrastructure provided in the road and when the road information includes information that there is an obstacle or a sharp curve ahead of the host vehicle. According to the road information, it is determined whether or not the host vehicle is to be decelerated.

The first determination as to the deceleration will be discussed in detail.

1-a: A case that the host vehicle travels on a curve where a road view ahead of the host vehicle is not clear and that road-vehicle communication receiver receives none of road information.

In order to simplify the explanation, it is supposed that the virtual preceding vehicle position (Xb, Yb) is just located at a point on a road connecting a straight lane and a curved lane. Display controller 20 calculates a prediction value Ygf of a lateral acceleration, which will be generated in near feature, from the road turn radius Rg ahead of the host vehicle and the host vehicle speed V obtained through GPS controller 12 by using the following equation (2).

$$Ygf=V^2/Rg \qquad (2)$$

Next, when prediction value Ygf of the lateral acceleration is greater than a deceleration threshold value Yglmt such as 0.35 g (Ygf≧Yglmt), it is determined that the deceleration of the host vehicle is executed. Therefore, a target deceleration Xgks of the virtual preceding vehicle is calculated by the following equation (3).

$$Xgks=(V-Vks)/Ts \qquad (3)$$

where Vks is a target vehicle speed of the virtual preceding vehicle and is calculated by the equation (4), and Ts is a deceleration time and is calculated by the equation (5).

$$Vks=\sqrt{(Yglmt \cdot Rg)} \qquad (4)$$

$$Ts=Lro/V \qquad (5)$$

By executing the above-mentioned processing, the determination for decelerating the virtual preceding vehicle at target deceleration Xgks is executed.

Next, the second determination as to the deceleration will be discussed. When the second determination is executed, a distance Xm from the host vehicle to the forward obstacle or a distance Xc to the forward curve, and a turn radius Rc of the curve has been known. Therefore, the deceleration determination is executed on the basis of this road information.

2-a: A case that the host vehicle travels on a curve where a road view ahead of the host vehicle is not clear and that road-vehicle communication receiver 13 receives the road information from the infrastructure of the road.

First, display controller 20 calculates the prediction value Ygf of the lateral acceleration from the following equation (6), as is similar to the case (1-a).

$$Ygf=V^2/Rc \qquad (6)$$

Next, when prediction value Ygf of the lateral acceleration is greater than a deceleration threshold value Yglmt such as 0.35 g (Ygf≧Yglmt), it is determined that the deceleration of the host vehicle is executed. Therefore, target deceleration Xgks of the virtual preceding vehicle is calculated by the following equation (7).

$$Xgks=(V-Vksc)/Ts2 \qquad (7)$$

where Vksc is a target vehicle speed of the virtual preceding vehicle and is calculated by the equation (8), and Ts2 is a deceleration time and is calculated by the equation (9).

$$Vksc=\sqrt{(Yglmt \cdot Rc)} \qquad (8)$$

$$Ts2=Xc/V \qquad (9)$$

By executing the above-mentioned processing, the determination for decelerating the virtual preceding vehicle at target deceleration Xgks is executed.

2-b: A case that there is an obstacle ahead of the host vehicle and that road-vehicle communication receiver 13 receives the road information from the infrastructure of the road.

First, display controller 20 calculates target deceleration Xgks of the virtual preceding vehicle on the basis of the distance Xm from the host vehicle to the forward obstacle and the following equation (10).

$$Xgks=V^2/2Xm \qquad (10)$$

Next, when target deceleration Xgks is greater than a deceleration traveling threshold value Xglmt such as 0.5 g (Xgks≧Xglmt), it is determined that the deceleration of the host vehicle should be executed. Therefore, it is determined that the virtual preceding vehicle is decelerated at target deceleration Xgks. When it is not necessary to execute the deceleration of the host vehicle, target deceleration Xgks is set at zero (Xgks=0).

At step S105, display controller 20 determines whether a preceding vehicle is existed ahead of the host vehicle. More specifically, display controller 20 executes the determination of the existence of the preceding vehicle from inter-vehicle distance L from the host vehicle to the preceding vehicle, which is obtained from forward controller 21 and reference inter-vehicle distance Lro calculated at step S103 according to the following equation (11).

$$L<Ka \cdot Lro+Lm \qquad (11)$$

where Ka is a margin coefficient and is 1.1 in this embodiment, and Lm is a constant which is a margin upon taking account of a longitudinal dimension and is set at 5 (m) in this embodiment.

When it is determined at step S105 that there is an actual preceding vehicle at a position ahead of the host vehicle, that is, when the actual preceding vehicle is located at a position very close to the host vehicle and when it is not preferable to display the virtual preceding vehicle, the program proceeds to step S110 wherein display controller 20 executes a display operation under a condition that no preceding vehicle exists ahead of the host vehicle.

When the existence condition of the actual preceding vehicle is changed from a not-existing condition to an existing condition, a condition fluctuation flag Fchg is set at 1 (Fchg=1). This condition fluctuation flag Fchg is employed for preventing a hunting phenomenon. If this flag Fchg is once set, Fchg=1 is maintained for a predetermined time period and is then reset at zero (Fchg=0).

When it is determined at step S105 that there is no preceding vehicle, that is, when it is determined that a distance between the preceding vehicle and the host vehicle is sufficiently large to display the virtual preceding vehicle, the program proceeds to step S106 wherein the behavior of the virtual preceding vehicle is set. When the existence condition of the preceding vehicle is changed from the existing condition to the not-existing condition, the condition fluctuation flag Fchg is set at 2 (Fchg=2). If this flag Fchg is once set, Fchg=2 is maintained for a predetermined time period and is then reset at zero (Fchg=0).

At step S106, when the virtual preceding vehicle is decelerated by target deceleration Xgks, display controller 20 calculates a pitching quantity $\phi p$ from the following equation (12) on the basis of a virtual preceding vehicle model.

$$\phi p = Xgks \cdot W \cdot hp/(Kp - W \cdot hp) \tag{12}$$

where W is a vehicle weight, Kp is a rigidity of a pitching, hp is a distance between a gravity center of the preceding vehicle and a pitch center and is treated as a constant value. On the basis of the obtained pitching quantity $\phi p$, a pitching behavior of the virtual preceding vehicle is generated.

Next, an inter-vehicle distance between the host vehicle and the virtual preceding vehicle under a condition the virtual preceding vehicle is decelerated according to target deceleration Xgks is calculated from the following equation (13). an initial value of the inter-vehicle distance is Vro.

$$Lr(n) = Lr(n-1) - Kg1 \cdot Vs(n-1) + Kg2 \cdot V(n-1) \tag{13}$$

where n is a suffix representative of a calculation cycle, n−1 is a previous time of n, Kg1 and Kg2 are conversion coefficients depending on the calculation cycle, and Vs is a vehicle speed of the virtual preceding vehicle and is represent by the following equation (14) in that an initial value of the virtual host vehicle is V.

$$Vs(n) = Vs(n-1) - Kg3 \cdot Xgks \tag{14}$$

where Kg3 is a conversion coefficient depending on the calculation cycle.

A distance between the host vehicle and the virtual preceding vehicle is represented by the inter-vehicle distance Lr. FIGS. 7A and 7B show images representative of the distance between the host vehicle and the virtual preceding vehicle. FIG. 7A shows a first condition in that the virtual preceding vehicle travels on a straight road, and FIG. 7B shows a second condition in that the virtual preceding vehicle has just turned into a curve from the straight road shown in FIG. 7A. As is understood from the comparison between FIGS. 7A and 7B, the inter-vehicle distance during the first condition of FIG. 7B is decreased as compared with that during the second condition of FIG. 7B.

A roll quantity $\phi r$ generated according to the turn condition of the virtual preceding vehicle is calculated based on the virtual preceding vehicle model from the following equation (15).

$$\phi r = Ygks \cdot W \cdot hr/(Krf + Krr - W \cdot hr) \tag{15}$$

where W is a vehicle weight, Krf and Krr are roll rigidities (front and rear), and hr is a distance between the vehicle gravity center of the virtual preceding vehicle and a roll axis and is treated as a constant. Ygks is a lateral acceleration of the preceding vehicle and is calculated from the following equation (16).

$$Ygks = Vs^2/R \tag{16}$$

where R is a turn radius (Rg or Rc) of a curve, and Vs is a vehicle speed of the virtual preceding vehicle.

Further, a yaw angle $\phi y$ of the virtual preceding vehicle is calculated from the following equations (17) and (18) based on the virtual preceding vehicle model.

$$d\phi y = Vs \cdot R \tag{17}$$

$$\phi y = \int d\phi y dt \tag{18}$$

Since the yaw angle $\phi y$ of the virtual preceding vehicle is a yaw angle with respect to the initial condition of the virtual preceding vehicle, it is necessary to take account of how the virtual preceding vehicle is viewed by a driver of the host vehicle. Therefore, the yaw angle $\phi yh$ of the virtual preceding vehicle relative to the host vehicle is calculated by using a yaw angle $\phi y\_org$ of the host vehicle and from the following equation (19).

$$\phi yh = \phi y - \phi y\_org \tag{19}$$

The yaw angle $\phi y\_org$ of the host vehicle is calculated from the integral of the detected yaw rate $d\phi$ of the host vehicle.

At step S107 display controller 20 executes n operation for producing the image of the virtual preceding vehicle. In this embodiment, display controller 20 commands projector 10 to project the virtual preceding vehicle only when virtual preceding vehicle display switch 15 outputs the switch signal Fon set at ON state. That is, when Fon=ON, the image of the virtual preceding vehicle is produced according to the pitching quantity $\phi p$, rolling quantity $\phi r$, yaw angle $\phi yh$, inter-vehicle distance Lr and the deceleration determination at step S104. When it is determined that the host vehicle should be decelerated, an image of the virtual preceding vehicle, which is flashing its tail lamps (brake lamps), is produced.

When it is determined at step S105 that the existing condition of the preceding vehicle is changed from the existing condition to the non-existing condition, that is, when the condition fluctuation flag Fchg is set at 2 (Fchg=2), the image of the virtual preceding vehicle is displayed although it has not been displayed.

The condition of the condition fluctuation flag Fchg is maintained for a predetermined time period if the condition fluctuation flag Fchg is once set. Accordingly, the image of the virtual preceding vehicle is displayed during the predetermined time period, so that the driver of the host vehicle feels that the image is naturally displayed.

Displaying method including a speed and an intensity of the displayed object is determined on the basis of the position of the host vehicle from GPS controller 12 and according to the road shape of the road ahead of the host vehicle. For example, when the host vehicle is traveling on a straight road on which the forward view of the host vehicle is clear, the image of the virtual preceding vehicle is displayed such that the virtual preceding vehicle gradually approaches the host vehicle from a remote position. Further, when the host vehicle approaches a curve and will soon turn the curve, the image of the virtual preceding vehicle is displayed such that the virtual preceding vehicle is just starting to turn the curve. Basically, the image of the virtual preceding vehicle is displayed so that the driver of the host vehicle is naturally aware of the existence of the virtual preceding vehicle.

At step S108, display controller executes a processing for displaying the image of the virtual preceding vehicle. More specifically, the image of the virtual preceding vehicle produced at step S107 is projected on front window glass 11 by means of projector 10 so that the driver can recognize the image as if the virtual preceding vehicle is located on a road ahead of the host vehicle. That is, upon taking account of the information of the road ahead of the host vehicle detected by GPS controller 12 and the height Hm of the driver's eyes detected by face image controller 23, the image of the virtual preceding vehicle is projected as if the virtual preceding vehicle is traveling on a lane ahead of the host vehicle.

On the other hand, when it is determined at step S105 that there is the actual preceding vehicle and when the program proceeds to step S110, an image that no virtual preceding vehicle exists is displayed. In this embodiment, when a visibility as to the forward view of the driver is poor due to rain or fog and when forward detection controller 21 can detect the position of the actual preceding vehicle, which is not clearly seen by the driver, by means of millimeter wave radar 7, the image of a vehicle is projected on front window glass 11 such that the preceding vehicle is located at the position detected by the forward detection controller 21. When the visibility of the forward view is not poor and when it is necessary to quickly execute the braking operation in response to the quick braking of the actual preceding vehicle or a suddenly appeared obstacle, display controller 20 informs the driver that which one of obstacle is an object for the decelerating operation and is to be paid attention in future by marking the object which is a cause of the deceleration operation.

When it is determined at step S105 that the existing condition of the preceding vehicle is changed from the non-existing condition to the existing condition, that is, when the condition fluctuation flag Fchg is set at 1 (Fchg=1), the display of the image of the virtual preceding vehicle is stopped. The condition of the condition fluctuation flag Fchg is maintained for a predetermined time period if the condition fluctuation flag Fchg is once set. Accordingly, the display of the image of the virtual preceding vehicle is stopped for the predetermined time period, so that the driver of the host vehicle feels that such display is natural.

Displaying method including a speed and an intensity of the displayed object is determined on the basis of the position of the host vehicle from GPS controller 12 and according to the road shape of the road ahead of the host vehicle. For example, it is displayed such that the virtual preceding vehicle passes an actual preceding vehicle, stops at a shoulder of the road or turns an intersection. By this display, the display of the virtual preceding vehicle is terminated so as not to impress a strange feeling to the driver.

At step S109, the setting of the alarm is executed. In reply to the setting of the alarm, alarm speaker 16 generates alarm sounds. Regardless of the existence of the preceding vehicle and of the display of the virtual preceding vehicle, when the necessity of the quick decelerating operation is informed to the driver, the alarm is generated.

When the virtual preceding vehicle is displayed and when display controller 20 requests the driver to execute a normal deceleration, such a request is sufficiently executed by decelerating the virtual preceding vehicle. When display controller 20 requests a further large deceleration of the host vehicle to the driver, in addition to the further large deceleration of the virtual preceding vehicle, the alarm is generated so as to adapt to the situation that the driver has not seen the forward view ahead of the host vehicle. By this alarm, the driver is forcibly aware of the necessity of the decelerating operation. When there is no virtual preceding vehicle and when it is necessary to inform the necessity of the deceleration of the host vehicle to the driver as discussed in step S104, the object, which is regarded as an object of the decelerating operation, is marked by display controller 20, and simultaneously the alarm is generated.

With the thus arranged display system, when it is determined from the traveling condition of the host vehicle and the road condition of a road ahead of the host vehicle that it is necessary to inform the necessity of the decelerating operation to the driver, display controller 20 projects the image showing that the virtual preceding vehicle is approaching the host vehicle. This projected image shows the change of the inter-vehicle distance between the host vehicle and the virtual preceding vehicle and the decelerating condition of the virtual preceding vehicle. Accordingly, the driver of the host vehicle suitably understands the degree of the necessity of the braking operation without impressing a strange feeling. Further, this information image and the driver's operation in response to the informed condition are the same as those during the normal driving condition, and therefore the driver's operation is smoothly carried out without requesting a further skill in operation.

Further, the arrangement of the first embodiment according to the present invention performs an advantage even when the request of the large decelerating operation is not emergent. That is, when it is predicted that the host vehicle generates a large lateral acceleration from the consideration of the curvature of a traveling curve whose forward is not clearly seen, by decelerating the vehicle speed of the virtual preceding vehicle until the host vehicle can smoothly travel, the driver can recognize the necessity of decelerating the host vehicle. By this operation, it becomes possible to naturally inform the next driving operation to be executed by the driver to the driver. This decreases the load of the driver as to the driving operation.

Although the first embodiment according to the present invention has been shown and described such that the deceleration of the host vehicle is executed by the driver and the information as to the deceleration is supplied to the driver by projecting the virtual preceding vehicle, it will be understood that the present invention is not limited to this disclosure and that the present invention may be arranged such that when the driver does not execute the decelerating operation even though the virtual preceding vehicle is decelerated and the alarm is generated, the braking force is automatically generated by employing an automatic deceleration control for automatically decelerating the host vehicle.

(Second Embodiment)

The second embodiment of the display system for the vehicle according to the present invention is particularly arranged to further comprise a selector switch by which one of a plurality of virtual preceding vehicles is selected. The plurality of the virtual preceding vehicles are different in type, shape and color, respectively. Therefore, the driver can select one of the virtual preceding vehicles according to driver's preference and the visibility of the virtual preceding vehicle by preferably operating the selector switch. The other construction and control of the second embodiment are the same as those of the first embodiment, and therefore the explanation thereof is omitted herein.

Accordingly, when the image of the virtual preceding vehicle is produced at step S107 in FIG. 5, display controller 20 of the second embodiment basically produces an image of the virtual preceding vehicle on the basis of pitching quantity $\phi p$, roll quantity $\phi r$, yaw angle $\phi yh$, inter-vehicle distance Lr and the determination at step S104. Further, in this second embodiment, in order that the driver further easily recognizes the virtual preceding vehicle, the shape of the virtual preceding vehicle is changed. For example, when the driver prefers a one-box type vehicle rather than a sedan type vehicle in recognizing the preceding vehicle, the driver can easily select the preferred type of the preceding vehicle by controlling the select switch. Furthermore, according to the road condition and weather, the color of the virtual preceding vehicle is freely changed by controlling the select switch.

(Third Embodiment)

Figure 8:
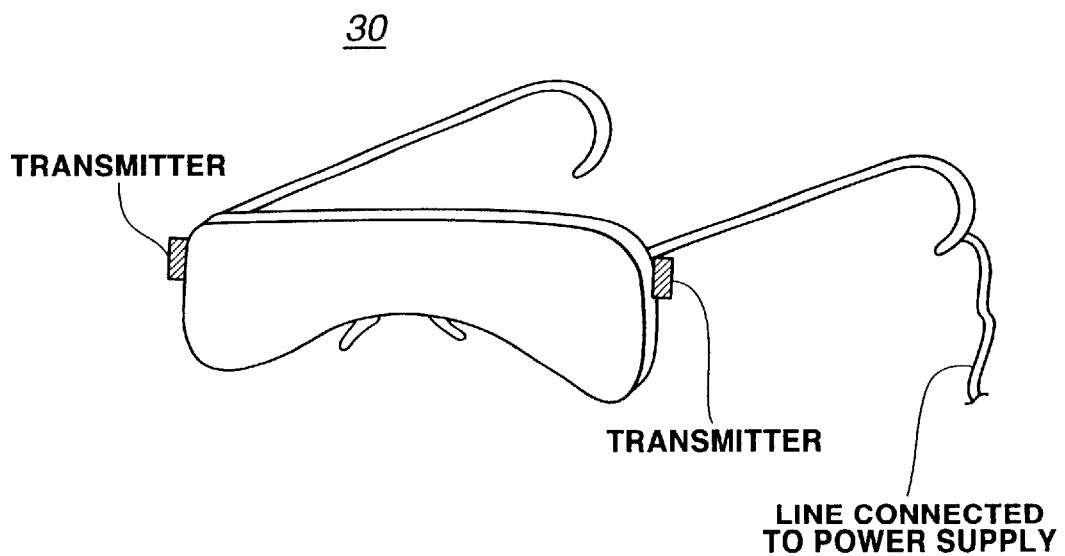
FIG. 8 is a perspective view showing a monitoring glasses employed in a third embodiment according to the present invention.

The third embodiment is specifically arranged to comprise a monitoring glasses 30 as a virtual preceding vehicle displaying means. The other construction and control of the third embodiment are the same as those of the first embodiment. Monitoring glasses 30 shown in FIG. 8 is worn by the driver and produces an image of the virtual preceding vehicle through which the driver feels as if the virtual preceding vehicle travels in a lane ahead of the host vehicle. The display control of the third embodiment is basically the same as the flowchart of FIG. 3 in the first embodiment except that at step S108 the display controller 20 outputs an image of the virtual preceding vehicle to monitoring glasses 30.

More specifically, in the case of the first embodiment, projector 10 projects the virtual preceding vehicle on front window glass 11 so that the driver recognizes the image of the virtual preceding vehicle as if the virtual preceding vehicle travels on a lane ahead of the host vehicle. Display controller 20 of the first embodiment takes account of the information as to the road condition of the road ahead of the host vehicle, which information is obtained from GPS controller 12, and a height Hm of driver's eyes detected by face image controller 23, and commands projector 10 to project the image as if the virtual preceding vehicle travels on a lane ahead of the host vehicle.

In contrast to this, when the driver wears monitoring glasses 30 and when the image of the virtual preceding vehicle is projected in monitoring glasses 30, it is necessary to vary the position of the virtual preceding vehicle according to a motion of a driver's head. Accordingly, a pair of transmitters are installed to side portions of monitoring glasses 30 as shown in FIG. 8. The transmitters are communicated with a pair of receivers installed at both upper right and left portions of front window glass 11 so that the direction of driver's face can be determined. According to the detected direction of the driver's face, the image of the virtual preceding vehicle is projected in monitoring glasses 30 so that the driver feels as if the virtual preceding vehicle is traveling on a lane ahead of the host vehicle even if the driver changes the direction of the face.

With the thus arranged display system according to the present invention, it is possible to inform the necessity of the braking operation to the driver by displaying the virtual preceding vehicle on a road ahead of the host vehicle.

This application is based on a prior Japanese Patent Application No. 2000-338941 filed on Nov. 7, 2000 in Japan. The entire contents of this Japanese Patent Application No. 2000-338941 are hereby incorporated by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A display system for a vehicle, comprising:
a projector projecting a virtual preceding vehicle at a position ahead of a driver of a host vehicle;
a vehicle condition detecting unit detecting a vehicle traveling condition of the host vehicle;
a road condition detecting unit detecting a road condition of a road ahead of the host vehicle; and
a controller coupled to the projector, the vehicle condition detecting unit and the road condition detecting unit, the controller being arranged:
to calculate a traveling condition of the virtual preceding vehicle on the basis of the vehicle traveling condition and the road condition,
to command the projector to project the virtual preceding vehicle which travels under the calculated traveling condition of the virtual preceding vehicle.

2. The display system as claimed in claim 1, wherein the calculated traveling condition of the virtual preceding vehicle is a future traveling condition of the host vehicle at a moment after a predetermined time period elapsed.

3. The display system as claimed in claim 1, wherein the projector displays the virtual preceding vehicle on a transparent glass ahead of the driver so that the driver recognizes the virtual preceding vehicle as if the virtual preceding vehicle travels within a lane ahead of the host vehicle.

4. The display system as claimed in claim 1, wherein the projector displays the virtual preceding vehicle on a monitor installed ahead of eyes of the driver so that the driver recognizes the virtual preceding vehicle as if the virtual preceding vehicle travels within a lane ahead of the host vehicle.

5. The display system as claimed in claim 1, further comprising a display changeover switch by which a changeover between display and non-display of the virtual preceding vehicle is executed.

6. The display system as claimed in claim 1, further comprising a virtual preceding vehicle selecting switch which is capable of selectively determining a vehicle model, a shape and a color of the virtual preceding vehicle.

7. The display system as claimed in claim 1, wherein the road condition detecting unit comprises at least a host vehicle position detector of a navigation system, a forward road circumstance recognizing means for recognizing a road circumstance of a road ahead of the host vehicle, and an infrastructure information receiving means for receiving road circumstance information of a road ahead of the host vehicle from an infrastructure.

8. The display system as claimed in claim 1, wherein the vehicle condition detecting unit comprises a vehicle behavior detecting means for detecting at least a vehicle speed, a longitudinal acceleration and a yaw rate of the host vehicle, and a drive operation quantity detecting means for detecting at least a steering angle, an accelerator pedal control quantity and a brake control quantity.

9. The display system as claimed in claim 1, wherein the controller is further arranged to change a distance between the host vehicle and the virtual preceding vehicle on the basis of the vehicle traveling condition of the host vehicle and the road condition of the road ahead of the host vehicle and to command the projector to project the virtual preceding vehicle such that the distance is changed.

10. The display system as claimed in claim 1, wherein the controller is further arranged to change a rolling quantity, a pitching quantity and a yawing quantity of the virtual preceding vehicle on the basis of the vehicle traveling condition of the host vehicle and the road condition of the road ahead of the host vehicle and to command the projector to project the virtual preceding vehicle such that the rolling quantity, the pitching quantity and the yawing quantity of the virtual preceding vehicle are changed.

11. The display system as claimed in claim 1, wherein the controller is further arranged to command the projector to project the virtual preceding vehicle such that the virtual preceding vehicle is decelerated when the controller determines that it is necessary to decelerate the host vehicle on the basis of the traveling condition of the host vehicle and the road condition of the road ahead of the host vehicle.

12. The display system as claimed in claim 11, wherein the controller is arranged to calculate a target deceleration of the virtual preceding vehicle on the basis of the vehicle traveling condition of the host vehicle and the road condition of the road ahead of the host vehicle and to command the projector to project the virtual preceding vehicle which performs to change a distance between the host vehicle and the virtual preceding vehicle according to the target deceleration and to turn on a braking lamp of the virtual preceding vehicle.

13. The display system as claimed in claim 1, wherein the controller commands the projector to project the virtual preceding vehicle only when the controller determines on the basis of the road condition of the road ahead of the host vehicle that no vehicle exists ahead of the host vehicle.

14. The display system as claimed in claim 13, wherein when the controller determines on the basis of the road condition of the road ahead of the host vehicle that a preceding vehicle existence condition is changed from a no-vehicle existing condition to a vehicle existing condition, the controller executes one of a first control for controlling the virtual preceding vehicle to pass an actual preceding vehicle, a second control for stopping the virtual preceding vehicle at a shoulder of a road, and a third control for turning the virtual preceding vehicle to right or left according to the road condition of the road ahead of the host vehicle.

15. The display system as claimed in claim 13, wherein when the controller determines on the basis of the road condition of the road ahead of the host vehicle that a preceding vehicle existence condition is changed from a vehicle existing condition to a no-vehicle existing condition, the controller executes one of a fourth control for approaching the virtual preceding vehicle to the host vehicle and a fifth control for positioning the virtual preceding vehicle at a start of a curve ahead of the host vehicle according to the road condition.

16. The display system as claimed in claim 13, wherein when the virtual preceding vehicle is not displayed due to the existence of an actual preceding vehicle and when the controller determines on the basis of the vehicle traveling condition of the host vehicle and the road condition of the road ahead of the host vehicle that it is necessary to execute the deceleration of the host vehicle, the virtual preceding vehicle controlling means executes a marking control for marking one of an actual preceding vehicle and an obstacle ahead of the host vehicle.

17. The display system as claimed in claim 1, wherein the controller commands the projector to project the virtual preceding vehicle when the controller determines on the basis of the road condition that there exists an actual vehicle ahead of the host vehicle and that it is difficult for the driver to recognize the actual vehicle.

18. A method for displaying a virtual preceding vehicle, comprising:
   detecting a vehicle traveling condition of a host vehicle;
   detecting a road condition of a road ahead of the host vehicle;
   calculating a traveling condition of a virtual preceding vehicle on the basis of the vehicle traveling condition and the road condition; and
   projecting the virtual preceding vehicle which travels under the calculated traveling condition of the virtual preceding vehicle, at a position ahead of a driver of the host vehicle.

19. A display system for a vehicle, comprising:
   preceding vehicle displaying means for displaying a virtual preceding vehicle at a position ahead of a host vehicle driven by a driver; and
   virtual preceding vehicle controlling means for changing a traveling condition of the virtual preceding vehicle so that the virtual preceding vehicle displayed is an image of the host vehicle at a predetermined future time.

20. A display system for a vehicle, comprising:
   virtual preceding vehicle displaying means for displaying a virtual preceding vehicle at a position ahead of a host vehicle driven by a driver;
   forward road condition detecting means for detecting a road condition of a road ahead of the host vehicle;
   host vehicle traveling condition detecting means for detecting a traveling condition of the host vehicle; and
   virtual preceding vehicle controlling means for changing a traveling condition of the virtual preceding vehicle on the basis of the road condition and the traveling condition of the host vehicle.

21. A vehicle comprising:
   a display system comprising:
      a projector projecting a virtual preceding vehicle at a position ahead of a driver of a host vehicle,
      a vehicle condition detecting unit detecting a vehicle traveling condition of the host vehicle,
      a road condition detecting unit detecting a road condition of a road ahead of the host vehicle, and
      a controller coupled to the projector, the vehicle condition detecting unit and the road condition detecting unit, the controller being arranged to calculate a traveling condition of the virtual preceding vehicle on the basis of the vehicle traveling condition and the road condition, and to command the projector to project the virtual preceding vehicle which travels under the calculated traveling condition of the virtual preceding vehicle.

* * * * *